US009497200B2

(12) United States Patent
Barkie et al.

(10) Patent No.: US 9,497,200 B2
(45) Date of Patent: Nov. 15, 2016

(54) MANAGING LIMITED NETWORK ACCESS CONFIGURATION

(71) Applicant: International Business Machines Corporation, Armonk, NY (US)

(72) Inventors: Eric J. Barkie, Cary, NC (US); Benjamin L. Fletcher, Denver, CO (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/623,001

(22) Filed: Feb. 16, 2015

(65) Prior Publication Data

US 2016/0241563 A1 Aug. 18, 2016

(51) Int. Cl.
*G06F 7/04* (2006.01)
*H04L 29/06* (2006.01)
*H04L 12/24* (2006.01)
*H04L 29/12* (2006.01)

(52) U.S. Cl.
CPC ......... *H04L 63/102* (2013.01); *H04L 41/0803* (2013.01); *H04L 61/6022* (2013.01); *H04L 63/02* (2013.01); *H04L 63/162* (2013.01); *H04L 63/164* (2013.01); *H04L 67/42* (2013.01)

(58) Field of Classification Search
CPC . H04L 63/102; H04L 63/162; H04L 63/164; H04L 67/42; H04L 41/0803; H04L 63/02; H04L 61/6022; H04L 12/40091; H04L 12/4625; H04L 29/12009; H04L 29/12018; H04L 61/10; H04L 69/16; H04L 69/166; H04L 69/168; H04L 69/169

USPC ........................................................... 726/4
See application file for complete search history.

(56) References Cited

U.S. PATENT DOCUMENTS 8,160,063 B2 4/2012 Maltz et al.
8,289,879 B2 10/2012 Brown
8,713,169 B2 4/2014 Zhang et al.
(Continued)

OTHER PUBLICATIONS

Crisan, D., et al., "Datacenter Applications in Virtualized Networks: A Cross-Layer Performance Study", IEEE Journal on Selected Areas in Communications, vol. 32, No. 1, Jan. 2014. pp. 77-87. Digital Object Identifier 10.1109/JSAC.2014.140108. © 2014 IEEE.
(Continued)

*Primary Examiner* — Kambiz Zand
*Assistant Examiner* — Abiy Getachew
(74) *Attorney, Agent, or Firm* — Brian Welle; Louis J. Percello (57) ABSTRACT

A system, a method, and a computer program product for managing network configuration by a controller. A request to connect a device to a network is received. The network is accessed by the device by a port. The controller determines the device to be authorized to connect to the network. The controller configures the port in response to determining the device as an authorized device to connect to the network. The controller configures the port according to a first set of parameters. The first set of parameters regulate communication of the device on the network. After configuring the port, the controller monitors a set of communications. The controller monitors the set of communications for an error. By monitoring the set of communications, the controller determines whether the port meets network specifications.

17 Claims, 3 Drawing Sheets

(56) References Cited

U.S. PATENT DOCUMENTS

| | | |
|---|---|---|
| 8,756,299 B2 | 6/2014 | Kim et al. |
| 2003/0112808 A1 | 6/2003 | Solomon |
| 2004/0123153 A1* | 6/2004 | Wright ................. G06F 21/32 726/1 |
| 2009/0122798 A1* | 5/2009 | Iwai ................. H04L 29/12783 370/392 |
| 2012/0294192 A1 | 11/2012 | Masood et al. |
| 2013/0144992 A1 | 6/2013 | Barabash et al. |
| 2013/0182604 A1 | 7/2013 | Moreno et al. |
| 2013/0308492 A1 | 11/2013 | Baphna et al. |
| 2014/0108777 A1 | 4/2014 | Nilakantan et al. |
| 2014/0115584 A1 | 4/2014 | Mudigonda et al. |

OTHER PUBLICATIONS

Mudigonda, J., et al., "NetLord: A Scalable Multi-Tenant Network Architecture for Virtualized Datacenters", SIGCOMM'11, Aug. 15-19, 2011, Toronto, Ontario, Canada. Copyright 2011. ACM 978-1-4503-0797-0/11/08.

Uchiumi, T., et al., "Misconfiguration Detection for Cloud Datacenters using Decision Tree Analysis", IEEE. 14th Asia-Pacific Network Operations and Management Symposium, 2012. DOI: 10.1109/APNOMS.2012.6356072.

Grace Period Disclosure, Wyskida, D., "The Dynamic Sensing and Automation of Datacenter Infrastructure Components", Center of Excellence Wireless and Information Technology (CEWIT) Conference, Oct. 29, 2014. Long Island, NY. Copyright 2013 IBM Corporation.

\* cited by examiner

MANAGING LIMITED NETWORK ACCESS CONFIGURATION

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURES

The Dynamic Sensing and Automation of Datacenter Infrastructure Components, Andrew Wyskida, oral presentation at the Center of Excellence Wireless and Information Technology conference on Oct. 29, 2014.

BACKGROUND

The present disclosure relates to computer systems, and more specifically, to managing network configuration by a controller.

In modern network architecture, servers and other network-enabled devices often have many different security classifications and roles. It is often advantageous to configure a server or device with limited access to other devices on a network. To ensure that a server or device is provided proper access within a network, it is often useful to configure not only that server or device but also additional peripheral components within the network.

SUMMARY

Aspects of the disclosure include managing network configuration by a controller. The controller may receive a request of a device. The request may be to connect the device to a network. The network may be accessed by the device by a port. The port may include a data link layer component and a network layer component which corresponds to layer 2 and layer 3, respectively, of the open systems interconnection (OSI) model of a communication system. The controller may determine the device to be authorized to connect to the network. The controller may configure the port in response to determining the device as an authorized device to connect to the network. The controller may configure the port according to a first set of parameters. The first set of parameters may regulate communication of the device on the network. After configuring the port, the controller may monitor a set of communications. The controller may monitor the set of communications for an error. By monitoring the set of communications, the controller may determine whether the port meets network specifications. In embodiments, the network specifications may be a list which details the network locations and devices which may transmit data to the device and receive data from the device.

In embodiments, the controller may determine that the device is authorized by referencing a device identifier against a database of network information. The controller may also use the database to configure the port by querying the database for the first set of parameters. Likewise, the controller may use the database to respond to the error. The error may include a communication failing at least one network specification. The network specifications may be from the database. The controller may query the database for a second set of parameters. In response to detecting the error, the controller may configure the port according to the second set of parameters.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a system and method for managing the configuration of devices (e.g., servers) in networks. The server may be configured by an intelligent controller. The controller may use a database of device information and network configuration to verify that a server is allowed to access a datacenter network. Once verified, the controller may use the database to properly configure the server's access to that network. The server may only have limited access to the network. The controller can ensure that the configuration is properly limiting the access of the server by monitoring communication over the server's port to the network. If the configuration is incorrect, the controller may reconfigure the server's port until the configuration is correct.

In some instances, servers may be configured manually by a human administrator. In such embodiments, manual configuration may be error prone and time intensive. Servers and devices which are given improper security classifications or clearances can lead to security breaches or communication breakdowns. Aspects of the disclosure may employ smart agents/intelligent controllers which configure network switches, sense and correct misconfigured servers/switches, and even dynamically manage downstream components such as firewalls in a datacenter/network. The intelligent controller may perform these functions by accessing comprehensive databases of server information and programmable network infrastructure to evaluate the required security classification of a new server. For example, the intelligent controller may receive a request for a new server to connect to a network and query a database to identify the server as a device with medium security clearance. In response to identifying the server as a device with medium security clearance, the intelligent controller may enable a port such that the device may communicate with other medium security clearance devices and may not access high security clearance devices. Managing configuration with an intelligent controller may result in performance benefits in selecting and implementing possible network configurations.

This process may begin with the intelligent controller recognizing that a new server is plugged into a network enabled port and identifying the new server by certain identifying characteristics (e.g., MAC address). The intelligent controller may compare these characteristics against a comprehensive database to verify that the new server is a known device. If the new server is known, the intelligent controller may configure the port of the new server based on performance/security/communication needs of the new server. In some embodiments, the intelligent controller may also configure other downstream network components, such as a network firewall. The intelligent controller may update an access control list used by the firewall to include devices the new server can communicate with. Once the port is enabled, the intelligent controller may monitor what existing servers/devices the new server is communicating with, regularly verifying that the new server has access to the intended existing devices. If the new server has improper access, the intelligence controller may intercept these communications before the communications reach their final destination (whether the new server or the existing device). Following this intercept, the intelligent controller may reconfigure the port to prevent future improper access. Dynamically monitoring, intercepting, and reconfiguring network settings for a server through a database may lead to performance benefits in verifying access.

Aspects of the disclosure include managing network configuration by a controller. The controller (e.g., intelligent controller) may receive a first request of a first device (e.g., the new server). The first request may be to connect the first device to a network. The network may be accessed by the first device by a first port. The first port may include a data link layer component and a network layer component which corresponds to layer 2 and layer 3, respectively, of the open systems interconnection (OSI) model of a communication system. The controller may determine the first device to be authorized to connect to the network. The controller may configure the first port in response to determining the first device as an authorized device to connect to the network. The controller may configure the first port according to a first set of parameters. The first set of parameters may regulate communication of the first device on the network. After configuring the first port, the controller may monitor a set of communications. The set of communications may include either a network packet, a data frame, or a network packet and a data frame. The network packet may be transmitted in the network layer component. The data frame may be transmitted in the data link layer component. The controller may monitor the set of communications for a first error. By monitoring the set of communications, the controller may determine whether the first port meets a set of network specifications. In embodiments, the set of network specifications may be a list within the database of network information which details the network locations (e.g., addresses, nodes) and devices (e.g., servers, routers, switches) which may transmit data to the first device and receive data from the first device.

In embodiments, the controller may determine that the device is authorized by using a database of network information. The controller may compare a first identifier of the first device (e.g., a MAC address of the server) to a set of device identifiers (a master list of MAC addresses which can connect to the network) in the database of network information. The controller may identify the first identifier as matching a device identifier from the set of device identifiers. The controller may also use the database of network information to configure the first port by querying the database for the first set of parameters. Likewise, the controller may use the database of network information to respond to the first error. The first error may include at least one communication (e.g., a network packet or a data frame) of the set of communications failing to achieve at least one network specification of the set of network specifications. The set of network specifications may be from the database of network information. The controller may query the database for a second set of parameters. In response to detecting the first error, the controller may configure the port according to the second set of parameters. By using unified data sources such as the database of network information, the controller may see consistency and uniformity benefits when configuring and monitoring network configurations.

In embodiments, the controller may receive a second request to connect to a network. The second request may result from a second device being physically connected to a second port of the network. The controller may determine the second device to be unauthorized to connect to the network. In response to determining the second device to be unauthorized to connect to the network, the controller may disable the second port. Alternatively, in response to determining the second device to be unauthorized to connect to the network, the controller may restrict the network access of the first device. Restricting the network access of the first device may include enabling the second port and allowing registration of the second device. Alternatively, restricting the network access of the first device may include enabling the second port and allowing the second device to access a quarantined network. The quarantined network may be a subset of the network which allows for minimal activity such as registration of the second device.

Figure 1:
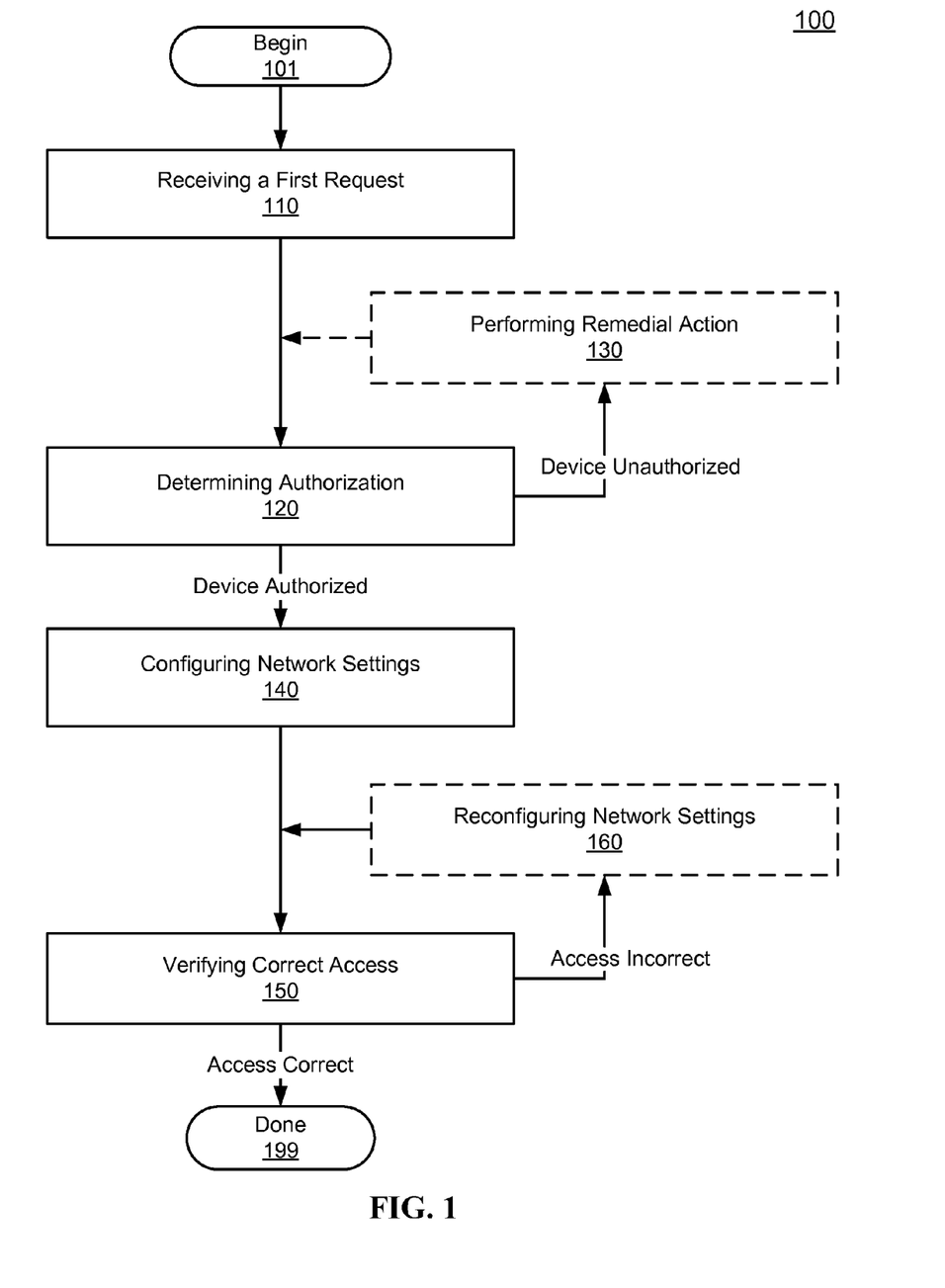
FIG. 1 depicts a method of managing network configuration of a device using a controller according to embodiments.

FIG. 1 is a flowchart illustrating a method 100 for managing network configuration by a controller. Aspects of method 100 may work on a number of operating systems. The method 100 begins at block 101. In embodiments, at block 101 a first device may be physically plugged into a switch port of a datacenter/network. In other embodiments, at block 101 a first device may be wirelessly connected to a port of a network. In certain embodiments, at block 101 a user may send a request for a first device to connect to a network.

At block 110 a controller receives a first request. The first request may be for a first device/asset (e.g., a server) to connect to a network (e.g., a datacenter network). The first request may be a call for access by a particular device (such a server) to a specific network. The request may include a first identifier (e.g., a MAC address) of the first device. The first device may connect to the network through a first port (e.g., a port of a switch). The first port may have a multitude of configurable components, such a data link layer component and a network layer component. The data link and network layer components may correspond to layer 2 and layer 3, respectively, of the open systems interconnection (OSI) model of a communication system.

In embodiments, the server/device may be plugged into the network-enabled first port. In such embodiments, the first request may be received when the switch which contains the port signals the controller. The switch may send the first identifier of the device to the controller in this first request. The controller may query the first identifier of the device on the network.

At block 120 the authorization of the device is determined. The first device may be authorized if the first device has been registered as a device with sufficient security access to connect to the network. In embodiments, the controller may determine the first device to be authorized to connect to the network. In order to determine that the first device is authorized, the controller may compare the first identifier of the server to a set of device identifiers. The set of device identifiers may be a list of addresses of servers which have a security clearance which allows access to the network.

The set of device identifiers may be in a database of network information. In embodiments, the database of network information may be a data source with visibility into metrics and statistics generated by servers, storage devices, network equipment, or virtual machines, the metrics and statistics related to power distribution units (PDUs), uninterruptable power supplies (UPSs), cooling systems, sensors, generators, or racks. In such embodiments, the controller may use this database for both initial configuration and later verification in method 100, providing consistency benefits by utilizing a homogenous data source. In certain embodiments, the set of device identifiers may be in a specific section of the database such as a procurement trail section. The procurement trail section may detail new devices which have been registered and but not yet connected into the network. The controller may compare the first identifier to the set of device identifiers by querying the database. If the first identifier matches a device identifier of the set of device identifiers, the controller may classify the device as authorized. For example, a controller may identify the MAC address of a server, query a database for this address, and locate an entry with an exact match of the MAC address which specifies the address as allowed to access the network. In certain embodiments, only an exact match between the device identifier and the first identifier may be used to determine the first device to be authorized.

In embodiments, the controller may determine a second device to be unauthorized to connect to the network. For example, a device may be unauthorized if the device has not been registered as a device with sufficient security access to connect to the network, or if the device has explicitly been registered as a device with insufficient security access to connect to the network. As another example, a device may be unauthorized if the device has not been registered. The controller may receive a request for the second device to connect to the network via a port (e.g., second port) as described herein. In response to receiving this request, the controller may compare the second identifier of the second device to the set of device identifiers as described herein. The controller may determine the second device to be unauthorized to access the network. In some embodiments, the controller may determine the second device is not authorized as a result of failing to identify a device identifier which matches the second identifier. In other embodiments, the controller may determine the second device is not authorized by matching the second identifier to a device identifier which classifies the device as unauthorized to connect to the network.

In embodiments, at block 130 the controller may perform a remedial action. The remedial action may include restricting the network access of the first device in response to the controller determining the second device as unauthorized to access the network. Restricting the network access may include the controller disabling the second port. While disabling the second port, the device may still be individually functionally but unable to access any information or communicate with any devices over the network. In embodiments, the controller may send a notification to a network/security administrator regarding the attempt to connect to the network by an unauthorized device.

Restricting the network access may include enabling the port such that the server has network access consisting exclusively of a captive portal for registration of the second device. For example, after restricting network access, the second device may be unable to perform any function on the network besides using a registration portal at which a user may register the second device. A network/security administrator may verify the legitimacy of the registration before the network is unlocked to allow proper access for the clearance of the second device. In certain embodiments, the controller may only move back to the main branch of method 100 if the second device successfully registers as an authorized device.

Restricting the network access may alternatively include enabling the second port such that the server has access to a quarantined network which may include the registration portion for registering the second device. For example, after restricting network access, the second device may only be able to access a certain subset of devices—or a certain subset of information within a subset of devices—which was predetermined to be "safe" even to unknown devices. In some embodiments, while in the quarantined network the second device may only be able to send information when registering at the registration portal. In certain embodiments, the controller may only move back to the main branch of method 100 if the second device registers as an authorized device.

At block 140, the controller configures network settings for the device. The controller may configure network settings in response to determining the device to be authorized to connect to the network. Configuring network settings may include the controller configuring the first port according to a first set of parameters. The controller may establish the first set of parameters by querying the database of network information. In embodiments, this comprehensive database will have predefined settings for network components based on prior successful arrangements and established practices which the controller may access and mine for data. The database of network information may also include device procurement trails (e.g., records involving new devices which are expected to be connected to the network), project databases, enterprise IT device guidance (e.g., providing no access to devices on the periphery of the network which are outside some security elements unless the device is firewalled), security classifications, or datacenter services capabilities (e.g., available networks, available IPs, proper network speed settings). In embodiments, the database of network information may be a series of databases or data sources which are maintained to have consistent data throughout.

The first set of parameters may be a list of computer network configurations that allow the first device to operate while communicating with a specific level of access to a specific list of devices/devices/servers. The first set of parameters may regulate communication of the first device on the network. For example, the parameters may set an access control list (ACL) for the switch which contains the first port. The access control list may contain a list of the address (e.g., IP addresses or MAC addresses) which the first device can transmit certain varieties of data to and receive certain varieties of data from. For example, the ACL may specify that the device is not authorized to receive layer three network packets from a specific IP address, or that the device is not authorized to send a specific type of layer three network protocol packets to a certain gateway address. The controller may configure the port to utilize this ACL when transmitting/receiving data. In certain embodiments, the controller may configure the device/server to utilize this ACL when transmitting/receiving data. In addition, the set of parameters may configure the port not only for the specific access and responsibilities of the device, but also for any other configuration needs (e.g., the virtual local area network (VLAN) the first device should be connected to, the switch port speed the first port should be set to, the duplex parameter for the port, power needs, cooling needs, data packet size, protocol type, etc.) to optimize the network connection for both the device and the network.

In embodiments, the network may have multiple levels of security and clearance between devices. In such embodiments, when a new device is connected to the network, the controller may configure not only the new device and the port/switch of that device, but also the surrounding elements in the network in order to maintain integrity and consistency across the network. To address these periphery network components, the first set of parameters may include configurations for the surrounding environment of the first device, such as the firewall for the network, downstream routers within the network, or a network intrusion prevention system (IPS). The controller may query the database to identify what security clearance the device has, what security class the device is, and what kind of downstream information the device will require in order to configure the surrounding environment. If the controller identifies a peripheral component which has a new list of locations/devices which the component can interact with (e.g. a new set of network specifications), the controller may configure that peripheral component. For example, if the first device is identified within the database as containing highly sensitive data, an existing firewall may be configured to restrict access to the server and an IPS may be configured to log all third-party attempts to access server data, whether or not the third party-attempt was granted. Configuring not only the server, port, and switch, but also the surrounding network components, may result in benefits in organizing coherent and secure network infrastructures.

At block 150 the controller verifies that the first device has the correct level of access. In embodiments, the controller may verify the level of access only after the first port has been configured and enabled according to the first set of parameters. The controller may determine the access to be correct if the first port meets a set of network specifications. In embodiments, the set of network specifications may be a list of devices/locations which the first device is allowed to send data/queries to and a list of devices/locations/nodes which the first device to receive data/queries from. In such embodiments, the set of network packet/data link/firewall communications may be subsets of the set of network specifications which include specifications on network packets, data frames, and ACL activities, respectively. In certain embodiments, network specifications may relate to not only the devices/locations/nodes which the first device can communicate with, but also the data within those devices/locations/nodes (e.g., the first device is only authorized to request a subset of available data from a specific server). The set of network specifications may relate to allowable communication over a plurality of layers on the OSI communication model. The set of network specifications may come from the database of network information. In order to determine if the first port meets the set of network specifications, the controller may monitor a set of communications for a first error. In embodiments, a first error may be either an event where the first device receives data/queries from a disallowed device or location or an event where the first device attempts to send data or queries to a disallowed device or location.

In certain embodiments, the first set of parameters is included in the set of network specifications. In such embodiments, the set of network specifications may include a "master list" of communication standards (e.g., packet size, port speed, data access, device access, etc.) which the first device must achieve, and the set of network parameters may be a combination of those standards selected by the controller to apply on the first port. For example, the network specifications may include that the first device may have access to all data on a first storage server, access to all data on a second storage server, and access to a subset of data on a third storage server. The subset of data may also exist on the first and second storage server. The controller may be able to select a multitude of elements from these network specifications to establish sufficient parameters. In this instance, the controller may establish a set of parameters which includes an ACL which grants the first device access to all data on the first storage server, all data on the second storage server, and the subset of data on the third storage server. Other parameters may also be available which would give the first device access to all data. In this way, the set of parameters are included in the network specifications.

The first error may include one or more events based on one or more situations related to the set of network specifications as described herein. In embodiments, the first error may include an event on the network layer. In certain embodiments, the network may use dynamic routing protocol. The event may include a device/system/subnet/node communicating with a disallowed device/system/subnet/node, wherein the first port is included in the communication. For example, a network packet may be sent to the first device (e.g., the new server) from a location with a first internet protocol ("IP") address. Upon monitoring, the controller may detect that the set of network specifications does not classify the first IP address as an allowed transmitter of network packets to the first device. Alternatively a layer 3 "incorrect source IP address" error may result from a network packet being sent from the first device with a first IP address that is determined to be not allowed or incorrect. For another example, a network packet may be sent by the first device to a gateway with a first network gateway address. Upon monitoring, the controller may detect that the first network gateway address is not classified as an allowed receiver of network packets from the first device or the first network gateway address is incorrect (e.g., layer 3 incorrect gateway address error). For another example, a network packet may be sent by the first device to a first network subnet address. Upon monitoring, the controller may detect that the first network subnet address is not classified as an allowed receiver of network packets from the first device or the first network address is incorrect (e.g., layer 3 incorrect subnet address). In addition to these examples, other suitable network layer (layer 3) errors are possible.

In embodiments, the first error may include an event on the data link layer. For example, an address resolution protocol (ARP) request from a network location may be received by the first device (e.g., the new server), or an ARP request may be broadcast by the first device. Upon monitoring, the controller may detect that the subnet or first device is not classified as an allowed location or is an incorrect subnet (e.g., layer 2 incorrect subnet configuration). For another example, while determining network communication paths through techniques such as a spanning tree protocol or link aggregation negotiation, the controller may determine various mismatches (e.g., layer 2 link aggregation negotiation mismatch, layer 2 spanning tree negotiation error). The mismatch relate to parameter such as speed, packet size, or protocol type. While several examples have been described, it should be understood that the first error may be any suitable data link (layer 2) error.

In embodiments, the set of communications may begin monitoring in response to a triggering event. In such embodiments, the triggering event may be a passage of time, a number of data frames received, a number of data frames transmitted, a number of network packets received, or a number of network packets transmitted. Other varieties of triggering events are possible. The controller may identify a number of consecutive occurrence of the first triggering event without a detection of the first error. For example, if the triggering event is a minute, the controller may have noticed ten consecutive occurrences of the triggering event (i.e. ten minutes) without a first error. The controller may detect the number of consecutive occurrences as meeting a monitoring drawdown criterion. In embodiments, a monitoring drawdown criterion may be a situation where communications have been without error for long enough that the controller can taper off monitoring. For example, the controller may have "10" as a monitoring drawdown criterion, and the ten minutes without a first error may meet this criterion. In response to the consecutive occurrences, the controller may monitor by a different standard (e.g. a second triggering event). The second triggering event may include a greater unit (relative to the first triggering event) which will not occur as frequently. For example, the second triggering event may include a longer passage of time (e.g., 5 minutes), a greater number of data frames received, a greater number of data frames transmitted, a greater number of network packets received, or a greater number of network packets transmitted. In this way the controller may monitor communication to the first device over the first port less frequently as the communication is consistently verified as correct. Aspects of the disclosure may have performance benefits as a result of this monitoring drawdown in response to the controller verifying the network access of the device as correct.

In embodiments, at block 160 the controller may reconfigure network settings. The controller may query the database of network information to establish a second set of parameters. In embodiments, the second set of parameters may alter the current configuration of the port so as to avoid a reoccurrence of the first error. In certain embodiments, the second set of parameters may be substantially similar to the first set of parameters. In such embodiments, the second set of parameters may set the switch back to the controller-designated settings (e.g., the first set of parameters) after, for example, a third party configured the switch to a different, sub-optimal set of parameters. The controller may configure, in response to detecting the first error, the first port according to the second set of parameters. In embodiments, the controller may intercept the communication in response to detecting the first error. In such embodiments, intercepting the communication may include blocking the communication before it is transmitted from or received by the first port. For example, if the triggering event included the first device receiving a network packet from a disallowed IP address, the port may both change the ACL to block the disallowed IP address and also stop the network packet from reaching the first device.

Figure 2:
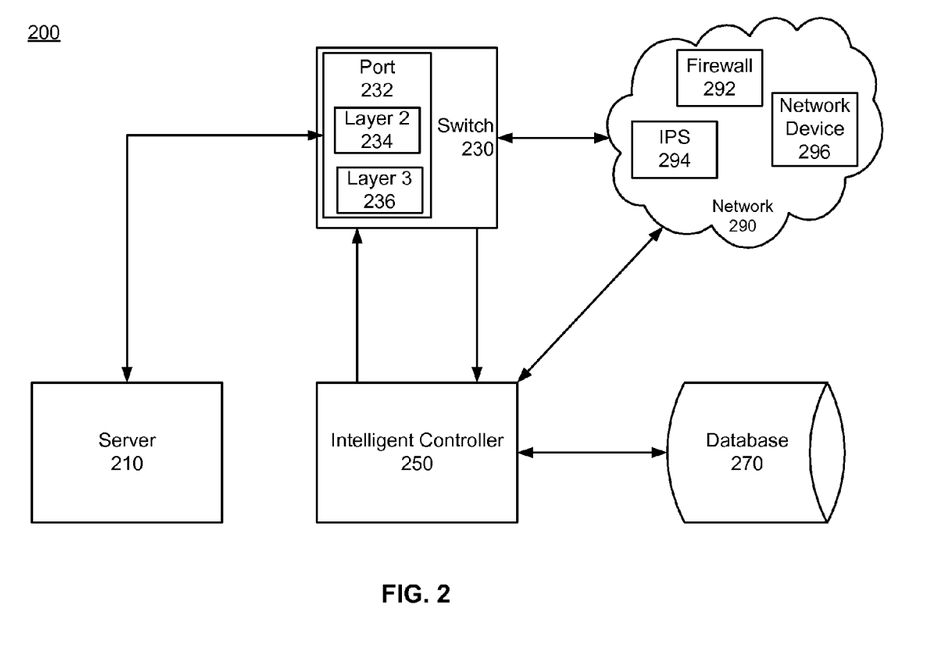
FIG. 2 depicts a simple system architecture including components for configuring a device for network access according to embodiments.

FIG. 2 depicts a system with components for configuring a device for access to a datacenter network according to embodiments. The components include an intelligent controller 250 consistent with the descriptions herein of a controller, a switch 230 which can contain the first port and second port as described herein, a database 270 consistent with the database of network information, and a server 210 that may connect to the network 290. FIG. 2 can be used to describe the method 100 of FIG. 1.

In embodiments, the server 210 (e.g., second device) may be physically plugged into the port 232 of a switch 230. The switch 230 may send the MAC address of the server 210 to the intelligent controller 250, which is a controller as described herein, managing layers of the OSI communication model within the datacenter. The port 232 may have components to deal with these layers, including a layer 2 component 234 and a layer 3 component 236. The controller 250 may execute a database lookup for the server information with the MAC address within the database 270. The controller 250 may not find any server information. The controller 250 may then pull applicable configuration information from the database 270 and send the configuration information to the switch 230. Once configured, the server 210 may have access to the network 290 through the switch 230. However, the server may only have access to a quarantined portion of the network, which allows limited access.

In embodiments, the server 210 (e.g., first device) may be physically connected to the switch 230. The switch may send the MAC address of the server 210 to the controller 250. The controller 250 may perform a database lookup of the MAC address in the database 270 and determine that the server 210 has both the highest security clearance to other devices and restricted incoming access (e.g., a classified role for the server which disallows some information requests). The controller 250 may send configuration information to the switch 230, which is promptly configured and enabled. With the highest security clearance and restricted incoming access, the server 210 may have access to all other devices in the network 290 while most other devices have no access to the server 210.

The controller may also configure downstream/peripheral components (e.g., a firewall, one or more network routers, one or more network switches, one or more servers or other devices included in the existing network, etc.) to reflect the clearance of the server being added. The controller 250 may configure the ACL of a network firewall 292 to restrict access to the server 210. The controller 250 may also configure a network IPS 294 to block any attempt to access the server 210 from an unidentified or quarantined device. The controller may also configure individual downstream network devices 296, such as configuring a network router 296 to block data requests from network devices with low clearance to the server 210.

In embodiments, the server 210 (e.g., first device) may be physically connected to the switch 230. The switch may send the MAC address of the server 210 to the controller 250. The controller 250 may perform a database lookup of the MAC address in the database 270 and determine that the server 210 has low security clearance with unrestricted incoming access (e.g., a general storage role for the server). The controller 250 may send configuration information to the switch 230, which is promptly configured and enabled. With the lowest security clearance and unrestricted incoming access, the server 210 may only have access to other devices with low security clearance in the network 290 while the majority of devices have access to the server 210. Despite this low access, the controller 250 may detect the server 210 querying a classified data source which contains information restricted to the server 210. The controller 250 may intercept this query before it reaches the aforementioned classified data source. The controller may also automatically reconfigure the switch 230 to disallow future instances of such queries. Dynamically intercepting undesired communication and reducing future instances by autonomous reconfiguring may result in security benefits.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Figure 3:
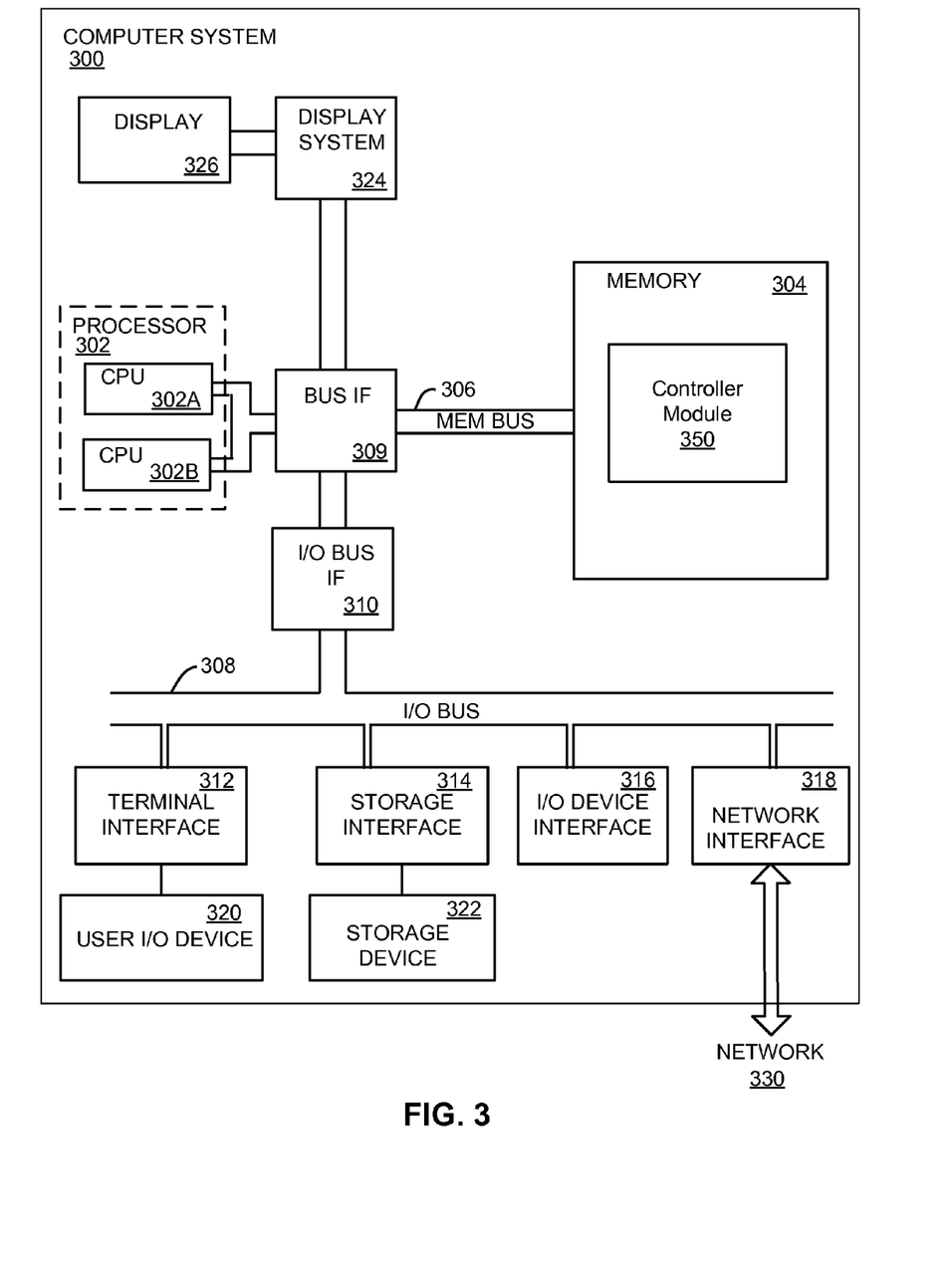
FIG. 3 depicts a system of managing network configuration of a device using a controller according to embodiments.

FIG. 3 depicts a high-level block diagram of a computer system 300 for implementing various embodiments. The mechanisms and apparatus of the various embodiments disclosed herein apply equally to any appropriate computing system. The major components of the computer system 300 include one or more processors 302, a memory 304, a terminal interface 312, a storage interface 314, an I/O (Input/Output) device interface 316, and a network interface 318, all of which are communicatively coupled, directly or indirectly, for inter-component communication via a memory bus 306, an I/O bus 308, bus interface unit 309, and an I/O bus interface unit 310.

The computer system 300 may contain one or more general-purpose programmable central processing units (CPUs) 302A and 302B, herein generically referred to as the processor 302. In embodiments, the computer system 300 may contain multiple processors; however, in certain embodiments, the computer system 300 may alternatively be a single CPU system. Each processor 302 executes instructions stored in the memory 304 and may include one or more levels of on-board cache.

In embodiments, the memory 304 may include a random-access semiconductor memory, storage device, or storage medium (either volatile or non-volatile) for storing or encoding data and programs. In certain embodiments, the memory 304 represents the entire virtual memory of the computer system 300, and may also include the virtual memory of other computer systems coupled to the computer system 300 or connected via a network. The memory 304 can be conceptually viewed as a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 304 may store all or a portion of the various programs, modules and data structures for processing data transfers as discussed herein. For instance, the memory 304 can store a controller module 350. In embodiments, the controller module 350 may include all or part of the instructions or statements that execute the method 100 on the processor 302 or instructions as further described herein. In certain embodiments, all or part of the controller module 350 is implemented in hardware via semiconductor devices, chips, logical gates, circuits, circuit cards, and/or other physical hardware devices in lieu of, or in addition to, a processor-based system. In embodiments, the controller module 350 may include data in addition to instructions or statements.

The computer system 300 may include a bus interface unit 309 to handle communications among the processor 302, the memory 304, a display system 324, and the I/O bus interface unit 310. The I/O bus interface unit 310 may be coupled with the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308. The display system 324 may include a display controller, a display memory, or both. The display controller may provide video, audio, or both types of data to a display device 326. The display memory may be a dedicated memory for buffering video data. The display system 324 may be coupled with a display device 326, such as a standalone display screen, computer monitor, television, or a tablet or handheld device display. In one embodiment, the display device 326 may include one or more speakers for rendering audio. Alternatively, one or more speakers for rendering audio may be coupled with an I/O interface unit. In alternate embodiments, one or more of the functions provided by the display system 324 may be on board an integrated circuit that also includes the processor 302. In addition, one or more of the functions provided by the bus interface unit 309 may be on board an integrated circuit that also includes the processor 302.

The I/O interface units support communication with a variety of storage and I/O devices. For example, the terminal interface unit 312 supports the attachment of one or more user I/O devices 320, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 320 and the computer system 300, and may receive output data via the user output devices. For example, a user interface may be presented via the user I/O device 320, such as displayed on a display device, played via a speaker, or printed via a printer.

The storage interface 314 supports the attachment of one or more disk drives or direct access storage devices 322 (which are typically rotating magnetic disk drive storage devices, although they could alternatively be other storage devices, including arrays of disk drives configured to appear as a single large storage device to a host computer, or solid-state drives, such as flash memory) for example the database 270 from FIG. 2. In some embodiments, the storage device 322 may be implemented via any type of secondary storage device. The contents of the memory 304, or any portion thereof, may be stored to and retrieved from the storage device 322 as needed. The I/O device interface 316 provides an interface to any of various other I/O devices or devices of other types, such as printers or fax machines. The network interface 318 provides one or more communication paths from the computer system 300 to other digital devices and computer systems; these communication paths may include, e.g., one or more networks 330.

Although the computer system 300 shown in FIG. 3 illustrates a particular bus structure providing a direct communication path among the processors 302, the memory 304, the bus interface 309, the display system 324, and the I/O bus interface unit 310, in alternative embodiments the computer system 300 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the computer system 300 may, in fact, contain multiple I/O bus interface units 310 and/or multiple I/O buses 308. While multiple I/O interface units are shown, which separate the I/O bus 308 from various communications paths running to the various I/O devices, in other embodiments, some or all of the I/O devices are connected directly to one or more system I/O buses.

In various embodiments, the computer system 300 is a multi-user mainframe computer system, a single-user system, or a server computer or similar device that has little or no direct user interface, but receives requests from other computer systems (clients). In other embodiments, the computer system 300 may be implemented as a desktop computer, portable computer, laptop or notebook computer, tablet computer, pocket computer, telephone, smart phone, or any other suitable type of electronic device.

FIG. 3 depicts several major components of the computer system 300. Individual components, however, may have greater complexity than represented in FIG. 3, components other than or in addition to those shown in FIG. 3 may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing network configuration by a controller comprising:
   receiving a first request of a first device to connect to a first port in a network in response to the first device physically plugging into the first port, the first port including a data link layer component and a network layer component;
   determining, with a processer, the first device to be authorized to connect to the network;
   configuring, with the processor, in response to determining the first device to be authorized to connect to the network, the first port according to a first set of parameters, wherein the first set of parameters is associated with communication of the first device on the network; and
   determining, with the processor, in response to configuring the first port according to the first set of parameters, whether the first port meets a set of network specifications by:
      monitoring, with the processor, the one or more communications for a set of errors in response to a first triggering event, wherein the first triggering event includes a passage of a first unit of time since a previous triggering event;
      identifying, with the processor, a number of consecutive occurrences of the first triggering event without a detection of an error of the set of errors, the number of consecutive occurrences meeting a monitoring drawdown criterion; and
      monitoring, with the processor, in response to identifying the number of consecutive occurrences as meeting the monitoring drawdown criterion, the one or more communications for the subset of errors in response to a second triggering event, wherein the second triggering event includes a passage of a second unit of time since a prior triggering event, the second unit of time being longer than the first unit of time.

2. The method of claim 1, wherein monitoring the one or more communications further comprises:
   detecting a first error of the subset of errors, wherein the first error includes a communication of the one or more communications failing to achieve a network specification of the set of network specifications;
   establishing, by querying a single database of network information, a second set of parameters, wherein the second set of parameter is associated with communication of the first device on the network; and configuring, in response to detecting the first error, the first port according to the second set of parameters.

3. The method of claim 1, further comprising:
detecting a first error of the subset of errors, wherein the first error includes a communication of the one or more communications failing to achieve a network specification of the set of network specifications;
intercepting, by the controller, in response to detecting the first error, the communication, wherein intercepting the communication includes blocking the communication.

4. The method of claim 1, further comprising detecting a first error of the subset of errors, wherein the first error includes a communication of the one or more communications failing to achieve a network specification pertaining to a network layer specification.

5. The method of claim 1, wherein:
the first set of parameters includes configurations for a firewall for the network; and
the set of network specifications includes a set of network locations and network devices which are classified as authorized to communicate with the first device.

6. The method of claim 1, further comprising:
receiving a second request of a second device to connect to a second port of the network;
determining the second device to be unauthorized to connect to the network; and
restricting, in response to determining the second device to be unauthorized to connect to the network, access of the second port to the network.

7. A system, comprising:
a processor; and
a memory coupled to the processor, wherein the memory comprises instructions for managing network configuration which, when executed by the processor, cause the processor to:
receive a first request of a first device to connect to a first port in a network, the first port including a data link layer component and a network layer component;
determine the first device to be authorized to connect to the network;
configure, in response to determining the first device to be authorized to connect to the network, the first port according to a first set of parameters, wherein the first set of parameters is associated with communication of the first device on the network; and
determine, in response to configuring the first port according to the first set of parameters, whether the first port meets a set of network specifications by:
monitoring the one or more communications for a set of errors in response to a first triggering event, wherein the first triggering event includes a passage of a first unit of time since a previous triggering event;
identifying a number of consecutive occurrences of the first triggering event without a detection of an error of the set of errors, the number of consecutive occurrences meeting a monitoring drawdown criterion; and
monitoring, in response to detecting the number of consecutive occurrences as meeting the monitoring drawdown criterion, the one or more communications for the subset of errors in response to a second triggering event, wherein the second triggering event includes a passage of a second unit of time since a prior triggering event, the second unit of time being longer than the first unit of time.

8. The system of claim 7, the memory further comprising instructions which, when executed by the processor, cause the processor to monitor the one or more communications by:
detecting a first error of the subset of errors, wherein the first error includes a communication of the one or more communications failing to achieve a network specification of the set of network specifications;
establishing, by querying a single database of network information, a second set of parameters, wherein the second set of parameters is associated with communication of the first device on the network; and
configuring, in response to detecting the first error, the first port according to the second set of parameters.

9. The system of claim 7, the memory further comprising instructions which, when executed by the processor, cause the processor to:
detect a first error of the subset of errors, wherein the first error includes a communication of the one or more communications failing to achieve a network specification of the set of network specifications;
intercept, by a controller, in response to detecting the first error, the communication, wherein intercepting the communication includes blocking the communication.

10. The system of claim 7, further comprising detecting a first error of the subset of errors, wherein the first error includes a communication of the one or more communications failing to achieve a network specification pertaining to a data link layer specification.

11. The system of claim 7, wherein:
the first set of parameters includes configurations for a firewall for the network; and
the set of network specifications includes a set of network locations and network devices which are classified as authorized to communicate with the first device.

12. The system of claim 7, the memory further comprising instructions which, when executed by the processor, cause the processor to:
receiving a second request of a second device to connect to a second port of the network;
determining the second device to be unauthorized to connect to the network; and
restricting, in response to determining the second device to be unauthorized to connect to the network, access of the second port to the network.

13. A computer program product comprising a non-transitory computer readable storage medium having a computer readable program stored therein, wherein the computer readable program, when executed on a first computing device, causes the first computing device to perform a method for managing network configuration comprising:
receiving a first request of a first device to connect to a first port in a network, the first port including a data link layer component and a network layer component;
determining the first device to be authorized to connect to the network;
configuring, in response to determining the first device to be authorized to connect to the network, the first port according to a first set of parameters, wherein the first set of parameters is associated with communication of the first device on the network, wherein the first set of parameters include configurations for a network firewall; and determining, in response to configuring the first port according to the first set of parameters, whether the first port meets a set of network specifications by:
- monitoring the one or more communications for a set of errors in response to a first triggering event, wherein the first triggering event includes a passage of a first unit of time since a previous triggering event;
- identifying a number of consecutive occurrences of the first triggering event without a detection of an error of the set of errors, the number of consecutive occurrences meeting a monitoring drawdown criterion; and
- monitoring, in response to detecting the number of consecutive occurrences as meeting the monitoring drawdown criterion, the one or more communications for the subset of errors in response to a second triggering event, wherein the second triggering event includes a passage of a second unit of time since a prior triggering event, the second unit of time being longer than the first unit of time.

14. The computer program product of claim 13, wherein the method further comprises monitoring the one or more communications by:
- detecting a first error of the subset of errors, wherein the first error includes a communication of the one or more communications failing to achieve a network specification of the set of network specifications;
- establishing, by querying a single database of network information, a second set of parameters, wherein the second set of parameters is associated with communication of the first device on the network; and
- configuring, in response to detecting the first error, the first port according to the second set of parameters.

15. The computer program product of claim 13, wherein the method further comprises:
- detecting a first error of the subset of errors, wherein the first error includes a communication of the one or more communications failing to achieve a network specification of the set of network specifications;
- intercepting, by a controller, in response to detecting the first error, the communication, wherein intercepting the communication includes blocking the communication.

16. The computer program product of claim 13, wherein:
- the first set of parameters includes configurations for the first device, for the first port, and for an intrusion detections system; and
- the set of network specifications includes an access control list of the network firewall which classifies network locations and devices as authorized to communicate with the first device.

17. The computer program product of claim 13, wherein the method further comprises
- receiving a second request of a second device to connect to a second port of the network;
- determining the second device to be unauthorized to connect to the network; and
- restricting, in response to determining the second device to be unauthorized to connect to the network, access of the second port to the network.

* * * * *